United States Patent [19]

Suda

[11] Patent Number: 4,927,250
[45] Date of Patent: May 22, 1990

[54] OPTICAL SYSTEM FOR COMPENSATING CHROMATIC ABHERRATION OF IMAGE

[75] Inventor: Shigeyuki Suda, Tokyo, Japan

[73] Assignee: Canon Kabushiki Kaisha, Tokyo, Japan

[21] Appl. No.: 232,533

[22] Filed: Aug. 16, 1988

Related U.S. Application Data

[63] Continuation of Ser. No. 844,383, Mar. 26, 1986, abandoned.

[30] Foreign Application Priority Data

Mar. 29, 1985 [JP] Japan .................................. 60-65467

[51] Int. Cl.⁵ ............................................. G02B 27/64
[52] U.S. Cl. ..................................... 350/500; 356/248
[58] Field of Search ....................... 350/427, 447, 500; 356/248, 250, 253, 254

[56] References Cited

U.S. PATENT DOCUMENTS 3,212,420 10/1965 Cierva ................................... 350/500
3,378,326 4/1968 Alvarez ................................. 350/500
3,942,862 3/1976 Furukawa et al. .................. 350/500

FOREIGN PATENT DOCUMENTS 57-7414 2/1982 Japan .................................. 350/500

Primary Examiner—Bruce Y. Arnold
Assistant Examiner—Martin Lerner
Attorney, Agent, or Firm—Fitzpatrick, Cella, Harper & Scinto

[57] ABSTRACT

An optical system comprises an image deflector having a variable refraction angle for forcibly moving an object image formed by an objective lens onto an image plane, and an aberration suppressor linked to the image deflector for suppressing a chromatic aberration developed in the object image due to the light refraction by the image deflector.

12 Claims, 10 Drawing Sheets

OPTICAL SYSTEM FOR COMPENSATING CHROMATIC ABHERRATION OF IMAGE

This application is a continuation of application Ser. No. 844,383 filed Mar. 26, 1986 now abandoned.

BACKGROUND OF THE INVENTION

1. Field of the Invention

The present invention relates to an optical system for an optical device with a stabilized image which moves an image of an object to keep it within a frame even if a still camera, video camera or telescope is vibrated, or an optical device for tracking fine movement of a object without panning the entire optical device.

2. Related Background Art

In an image stabilizing compensation optical system in a prior art imaging optical system, a refraction element, for example, a variable apex angle prism P is arranged at an end of an imaging optical system S closer to an object as shown in FIG. 1, and an apex angle $\theta$ is varied in accordance with a swing of the device to deflect an image. Such an optical system is disclosed in U.S. Pat. No. 3,212,420. However, because of a color dispersion effect of a prism material, a magnification chromatic aberration proportional to a focal distance f of the imaging optical system S and a dispersion of the prism P and a focusing performance is degraded.

For example, when a reference wavelength $\lambda_0$ deflected by the prism P is directed to the imaging optical system S parallel with an optical axis of the imaging optical system S, other wavelengths $\tau_n$ (n=1, 2, 3, ...) are directed to the imaging optical system S provided rearward at exit angles $\pi_n$ (n=1, 2, 3, (angles between the optical axis and incident directions) determined by the dispersion of the material of the prism P. Accordingly, a magnification chromatic aberration $\Delta y_n$ (n=1, 2, 3, ...) at the wavelength $\lambda_n$ created by the prism P is represented by $$\Delta y_n = f \cdot \tan \tau_n \ (n=1, 2, 3, \ldots) \quad (1)$$

For example, assume that a handy video camera is used in hand and an inclination (compensation deflection angle) of a deflected image due to a shaking of the device relative to the optical axis of the imaging optical system is 3°. The focal distance of the imaging optical system is 50 mm, and a refraction type variable apex angle prism is made of silicone rubber having refraction coefficients for d-line, g-line and c-line of $n_d=1.4059$, $n_g=1.4156$ and $n_c=1.4035$, respectively. The magnification chromatic aberration $\Delta y_n$ represented by the formula (1) is $\Delta y_g = -62$ μm and $\Delta y_c = 15$ μm with respect to the d-line.

In order to maintain a focusing performance, it is desirable that a range of the magnification chromatic aberration is less than 10–20 μum. Thus, in the prior art system, the compensation angle should be limited to less than 30°, or the focusing performance must be sacrificed.

On the other hand, Japanese Patent Application Laid-open No. 7416/1982 proposes to vary apex angles of a plurality of variable apex angle prisms made of media having different dispersions in order to prevent the chromatic aberration. This method, however, requires complex angle control or is limited to a proper combination of media.

SUMMARY OF THE INVENTION

It is an object of the present invention to provide an optical system which can prevent degradation of an image quality which would be caused when an object image on an image plane is moved by a refraction device to stabilize the image or track the object.

It is another object of the present invention to provide an optical system which can suppress chromatic aberration, particularly magnification chromatic aberration which is a major cause of degradation of image quality.

It is another object of the present invention to provide an optical system having an expanded compensation angle to stabilize the image or track the object.

DETAILED DESCRIPTION OF THE PREFERRED EMBODIMENTS

Figure 1:
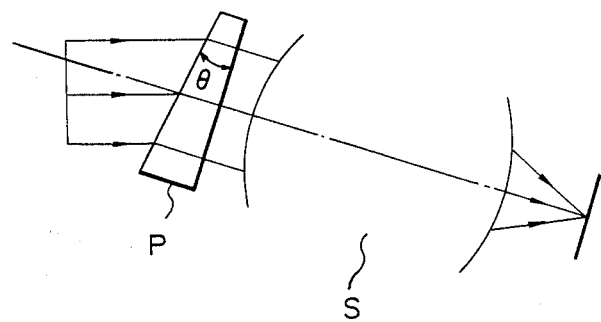
FIG. 1 shows a prior art image stabilizing optical system.

In the optical system of the present invention, in order to achieve the above objects, refraction type image deflection means and aberration compensation means for compensating for an aberration generated by the refraction type image deflection means are provided in an arrangement in which they cooperate to achieve the desired effect.

The refraction type image deflection means can two-dimensionally deflect an image focused by an imaging optical system. It may be a variable apex angle prism. In a simplest arrangement, the refraction type image deflection means is arranged at an end of the optical system closer to an object. The aberration compensation means compensates for magnification chromatic aberration caused by deflecting the image by the refraction type image deflection means. It may be a lens unit or a movable prism which is two-dimensionally moved normally to an optical axis in accordance with a deflection direction and a deflection angle of the refraction type image deflection means to compensate for the aberration. The aberration compensation means is arranged at an end of the optical system furthest from the object and is linked to the refraction type image deflection means.

The lens unit for compensating for the aberration may be a lens unit having at least a pair of lenses of high dispersion material and low dispersion material. Preferably, one of the pair of lenses is a positive lens and the other is a negative lens.

In a more preferable arrangement of the lens unit, the lens unit has at least one positive lens having an Abbe number Vd1 and at least one negative lens having an Abbe number Vd2, and a combined power $\phi$ of the lens unit at a reference wavelength is $$\phi \approx 0 \quad (2)$$

and $$|Vd1 - Vd2| \geq 15 \quad (3)$$

The formula (2) shows that the combined power $\phi$ is essentially zero, and the formula (3) shows that a difference between the Abbe numbers of the positive lens and the negative lens is at least 15, although the power $\phi$ and the difference between the Abbe numbers $|Vd1-Vd2|$ vary depending on the materials of the lenses of the lens unit, an arrangement of the lens, a limitation to the lens design and a performance of a drive system for driving the lens unit normally to the optical axis.

When the lens unit comprises a combined lens of a rigid positive lens having the Abbe number Vd1 and a rigid negative lens having the Abbe number Vd2, the number of lenses is minimized and a weight is reduced. In this case, if one of the positive lens and negative lens is made of a high dispersion material and the other is made of a low dispersion material, and refraction coefficients $n_{g1}$ and $n_{c1}$ of the high dispersion material to g-line and c-line and refraction coefficients $n_{g2}$ and $n_{c2}$ of the low dispersion material to the g-line and the c-line meet the following formula (4), the aberration can be more effectively compensated.

$$n_{g1} - n_{g2} - n_{c1} + n_{c2} \gtrsim 0.02 \quad (4)$$

As one of the aberration compensation means, the aberration compensation by a lens unit which is two dimensionally moved normally to the optical axis is explained.

Figure 2A:
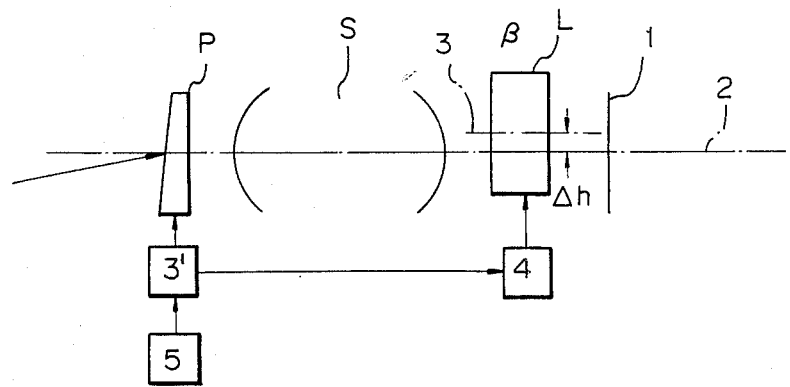
FIGS. 2A–2C show basic arrangements for compensating aberration caused by moving lenses.
Figure 2B:
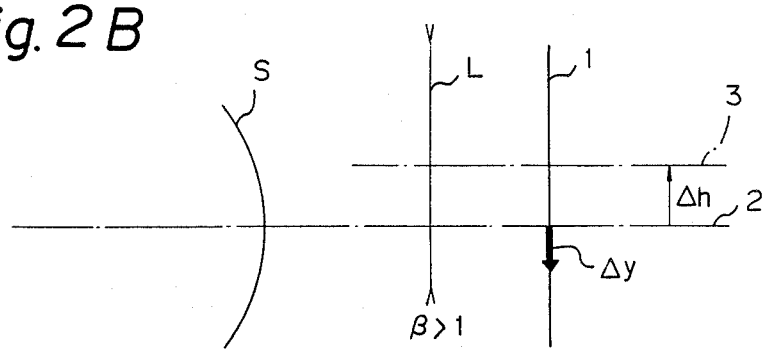
Figure 2C:
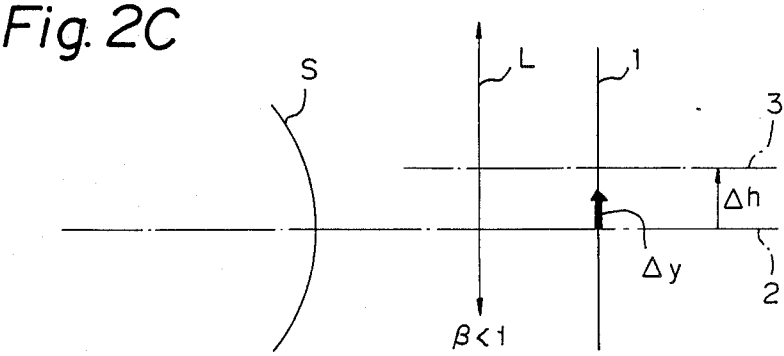

FIGS. 2A-2C show a principle of the aberration compensation by the moving lens unit. P denotes a refraction type image deflection means such as a prism, S denotes an imaging optical system, L denotes an aberration compensation lens unit, numeral 1 denotes an image plane, numeral 2 denotes an optical axis of an overall system and numeral 3 denotes a center axis of the aberration compensation lens unit L.

FIG. 2A shows the arrangement of the refraction type image deflection means P, imaging optical system S and aberration compensation lens unit L. They are arranged in this order starting from an object. FIGS. 2B and 2C show focusing action of the aberration compensation lens unit L. FIG. 2B is for a long wavelength, and FIG. 2C is for a short wavelength. The prism P is constructed by holding a transparent and readily deformable material such as silicone rubber between two parallel plates, and an angle between the parallel plates is set by an angle setter 3'. Numeral 4 denotes a driver for moving the aberration compensation lens unit L in a direction normal to the optical axis 2 while maintaining the center axis 3 parallel therewith. It is linked to the angle setter 3'. Numeral 5 denotes a compensation angle detector which may be a gyrometer or an acceleration meter.

A focusing magnification of the aberration compensation lens unit L is given by $\beta$. The aberration compensation lens unit L is moved normally to the optical axis, that is, in a manner whereby the center axis 3 and the optical axis 2 are in a parallel relationship and the difference therebetween is represented by $\Delta h$. This off-centered relationship compensates for the aberration generated by the refraction type image deflection means P. The optical axis 2 of the overall system before off-centering compensation movement is coincident with the center axis 3 of the aberration compensation lens unit. An object height y of an indefinite object on the optical axis by the imaging optical system S and an image height y' focused by the aberration compensation lens unit L, relative to the center axis 3 of the aberration compensation lens unit after the off-centering, are represented by $$y = -\Delta h \quad (5)$$

$$y' = -\Delta h \cdot \beta \quad (6)$$

Accordingly, a movement distance $\Delta y$ of the image point relative to the optical axis 2 of the overall system before the off-centering is given by $$\Delta y = \Delta h + y' = (1 - \beta) \quad (7)$$

If a power $\phi$ of the aberration compensation lens unit L to a reference wavelength $\lambda_0$ is essentially zero ($\phi \approx 0$), the focusing magnification $\beta$ of the aberration compensation lens unit L to the reference wavelength $\lambda_0$ is essentially 1 and the movement distance $\Delta y$ of the image point is essentially zero ($\Delta y \approx 0$). If the focusing magnification $\beta$ is set to $\beta > 1$ for a wavelength $\lambda_1$ ($\lambda_1 > \lambda_0$) and to $\beta < 1$ for a wavelength $\lambda_2$ ($\lambda_2 < \lambda_0$), and if the movement distance $\Delta h$ of the aberration compensation lens unit L meets $\Delta h > 0$, the displacement $\Delta y$ for the wavelength $\lambda_1$ is $\Delta y < 0$ as shown in FIG. 2B, and the displacement $\Delta y$ for the wavelength $\lambda_2$ is $\Delta y > 0$ as shown in FIG. 2C. Thus, a diversing system is provided for the wavelength $\lambda_1$ which is longer than the reference wavelength $\lambda_2$, and a converging system is provided for the wavelength $\lambda_2$ which is shorter than the reference wavelength $\lambda_0$. Accordingly, as the aberration compensation lens unit L is off-centered while its center axis 3 is parallel with the optical axis 2, the direction of deflection by the lens unit L can be reversed for the longer wavelength 80 1 and the shorter wavelength $\lambda_2$. Accordingly, the magnification chromatic aberrations for the longer wavelength 1 and the shorter wavelength $\lambda_2$ generated around the reference wavelength in the refraction type image deflection means are cancelled out by the lens unit L.

The aberration compensation lens unit L may be constructed by a negative lens which is SFL6 manufactured by Kohara Kogaku Glass Mfg. and a positive lens which is La SFO manufactured by the same manufacturer. They are combined into a composite lens. First and third planes of the composite lens are planar and a second plane has a radius of curvature Y. Powers $\phi$ of the composite lens for d-line, g-line and c-line are $$\phi_d = 0.00118/\gamma$$

$$\phi_g = 0.002155/\gamma$$

$$\phi_c = 0.00272/\gamma$$

Accordingly, when the d-line is used as the reference waveform, the powers to the g-line and c-line are opposite in polarity, and the focusing magnification $\beta$ of the composite lens for the g-line is $\beta<1$ when $\gamma>0$, and the focusing magnification $\beta$ for the c-line is $\beta>1$. Thus, by moving the complex lens normally to the optical axis, the direction of deflection by the composite lens can be reversed for the longer wavelength and the shorter wavelength.

The reference wavelength $\lambda_0$ described above is any wavelength in the band of the imaging center wavelength. Alternatively, a longer wavelength or a shorter wavelength beyond the center wavelength band may be used as the reference wavelength $\lambda_0$. The reference wavelength may be determined taking simplicity of lens design and a desired aberration compensation effect into account.

Lens data of the image stabilizing optical system are shown in Tables 1 and 2. In the Tables, F denotes a focal distance, FNO denotes an F-number, 2W denotes an image angle, Ri (i=1, 2, ...) denotes a radius of curvature of i-th plane from the object, Di (i=1, 2, ...) an axial thickness or axial air gap between i-th and (i+1)th planes from the object, and Ni and Vi (i=1, 2, ...) denote a refraction coefficient and an Abbe number of i-th lens or optical member from the object.

In the image stabilizing optical systems shown in Tables 1 and 2, a variable apex angle prism comprising R1–R4 is used as the refraction type image deflection means, a composite lens having a plane-concave lens comprising R34 and R35 and a plane-convex lens comprising R35 and R36 is used in the image stabilizing optical system of Table 1. A composite lens having a plane-concave lens comprising R34 and R35 and a double-convex lens comprising R35 and R36 is used in the image stabilizing optical system of Table 2. Other optical systems than the variable apex angle prism and the aberration compensation lens unit are identical between the embodiments of Tables 1 and 2. Both embodiments are used as the image stabilizing optical systems for video zoom lens. Accordingly, the lens data shown in the Tables show status only at a telescope end of the video zoom lens.

TABLE 1

| F = 50.16 | FNO = 1:1.4 | 2W = 9.1° | |
|---|---|---|---|
| R1 = 0.0 | D1 = 1.00 | N1 = 1.51633 | ν1 = 64.1 |
| R2 = 0.0 | D2 = 3.50 | N2 = 1.40590 | ν2 = 0.0 |
| R3 = 0.0 | D3 = 1.00 | N3 = 1.51633 | ν3 = 64.1 |
| R4 = 0.0 | D4 = 2.30 | | |
| R5 = 131.050 | D5 = 2.00 | N4 = 1.80518 | ν4 = 25.4 |
| R6 = 41.287 | D6 = 8.10 | N5 = 1.60311 | ν5 = 60.7 |
| R7 = −102.213 | D7 = 0.15 | | |
| R8 = 32.037 | D8 = 4.50 | N6 = 1.69680 | ν6 = 55.5 |
| R9 = 96.600 | D9 = 1.597 | | |
| R10 = 90.607 | D10 = 1.00 | N7 = 1.77250 | ν7 = 49.6 |
| R11 = 14.094 | D11 = 3.86 | | |
| R12 = −17.700 | D12 = 1.00 | N8 = 1.73500 | ν8 = 49.8 |
| R13 = 17.707 | D13 = 3.20 | N9 = 1.84666 | ν9 = 23.9 |
| R14 = −320.118 | D14 = 22.796 | | |
| R15 = −22.010 | D15 = 1.00 | N10 = 1.69680 | ν10 = 55.5 |
| R16 = −280.077 | D16 = 3.16 | | |
| R17 = 63.700 | D17 = 4.20 | N11 = 1.71300 | ν11 = 53.8 |
| R18 = −25.615 | D18 = 0.20 | | |
| R19 = −2809.374 | D19 = 6.00 | N12 = 1.51633 | ν12 = 64.1 |
| R20 = 0.0 | D20 = 4.80 | | |
| R21 = 0.0 | D21 = 2.05 | | |
| R22 = 40.769 | D22 = 3.00 | N13 = 1.74400 | ν13 = 44.7 |
| R23 = −65515.324 | D23 = 2.86 | | |
| R24 = −17.799 | D24 = 1.00 | N14 = 1.84666 | ν14 = 23.9 |
| R25 = −32.998 | D25 = 0.15 | | |
| R26 = 20.410 | D26 = 3.90 | N15 = 1.69680 | ν15 = 55.5 |
| R27 = 213.229 | D27 = 8.63 | | |
| R28 = 32.539 | D28 = 1.10 | N16 = 1.80518 | ν16 = 25.4 |
| R29 = 11.908 | D29 = 2.70 | | |
| R30 = −48.824 | D30 = 2.50 | N17 = 1.51633 | ν17 = 64.1 |
| R31 = −20.856 | D31 = 0.15 | | |

TABLE 1-continued

| F = 50.16 | FNO = 1:1.4 | 2W = 9.1° | |
|---|---|---|---|
| R32 = 16.092 | D32 = 4.20 | N18 = 1.72151 | ν18 = 29.2 |
| R33 = −114.180 | D33 = 0.50 | | |
| R34 = 0.0 | D34 = 0.75 | N19 = 1.80518 | ν19 = 25.4 |
| R35 = 12.498 | D35 = 8.25 | N20 = 1.80400 | ν20 = 46.6 |
| R36 = 0.0 | D36 = 3.00 | | |
| R37 = 0.0 | D37 = 5.50 | N21 = 1.51633 | ν21 = 64.1 |
| R38 = 0.0 | | | |

TABLE 2

| F = 50.16 | FNO = 1:1.4 | 2W = 9.1° | |
|---|---|---|---|
| R1 = 0.0 | D1 = 1.00 | N1 = 1.51633 | ν1 = 64.1 |
| R2 = 0.0 | D2 = 3.50 | N2 = 1.40590 | ν2 = 0.0 |
| R3 = 0.0 | D3 = 1.00 | N3 = 1.51633 | ν3 = 64.1 |
| R4 = 0.0 | D4 = 2.30 | | |
| R5 = 131.050 | D5 = 2.00 | N4 = 1.80518 | ν4 = 25.4 |
| R6 = 41.287 | D6 = 8.10 | N5 = 1.60311 | ν5 = 60.7 |
| R7 = −102.213 | D7 = 0.15 | | |
| R8 = 32.037 | D8 = 4.50 | N6 = 1.69680 | ν6 = 55.5 |
| R9 = 96.600 | D9 = 1.597 | | |
| R10 = 90.607 | D10 = 1.00 | N7 = 1.77250 | ν7 = 49.6 |
| R11 = 14.094 | D11 = 3.86 | | |
| R12 = −17.700 | D12 = 1.00 | N8 = 1.73500 | ν8 = 49.8 |
| R13 = 17.707 | D13 = 3.20 | N9 = 1.84666 | ν9 = 23.9 |
| R14 = −320.118 | D14 = 22.796 | | |
| R15 = −22.010 | D15 = 1.00 | N10 = 1.69680 | ν10 = 55.5 |
| R16 = −280.077 | D16 = 3.16 | | |
| R17 = 63.700 | D17 = 4.20 | N11 = 1.71300 | ν11 = 53.8 |
| R18 = −25.615 | D18 = 0.20 | | |
| R19 = 0.0 | D19 = 6.00 | N12 = 1.51633 | ν12 = 64.1 |
| R20 = 0.0 | D20 = 4.80 | | |
| R21 = 0.0 | D21 = 2.05 | | |
| R22 = 39.812 | D22 = 3.00 | N13 = 1.71300 | ν13 = 53.8 |
| R23 = −222.982 | D23 = 2.86 | | |
| R24 = −18.753 | D24 = 1.00 | N14 = 1.84666 | ν14 = 23.9 |
| R25 = −43.535 | D25 = 0.15 | | |
| R26 = 19.556 | D26 = 3.90 | N15 = 1.69680 | ν15 = 55.5 |
| R27 = 132.076 | D27 = 8.63 | | |
| R28 = 31.909 | D28 = 1.10 | N16 = 1.80610 | ν16 = 40.9 |
| R29 = 11.944 | D29 = 2.70 | | |
| R30 = −38.121 | D30 = 2.50 | N17 = 1.53172 | ν17 = 48.9 |
| R31 = −19.290 | D31 = 0.15 | | |
| R32 = 15.972 | D32 = 4.20 | N18 = 1.84666 | ν18 = 23.9 |
| R33 = 1335.197 | D33 = 0.50 | | |
| R34 = 0.0 | D34 = 0.75 | N19 = 1.92286 | ν19 = 20.9 |
| R35 = 9.998 | D35 = 8.25 | N20 = 1.88300 | ν20 = 40.8 |
| R36 = −225.550 | D36 = 3.00 | | |
| R37 = 0.0 | D37 = 5.50 | N21 = 1.51633 | ν21 = 64.1 |
| R38 = 0.0 | | | |

Figure 3A:
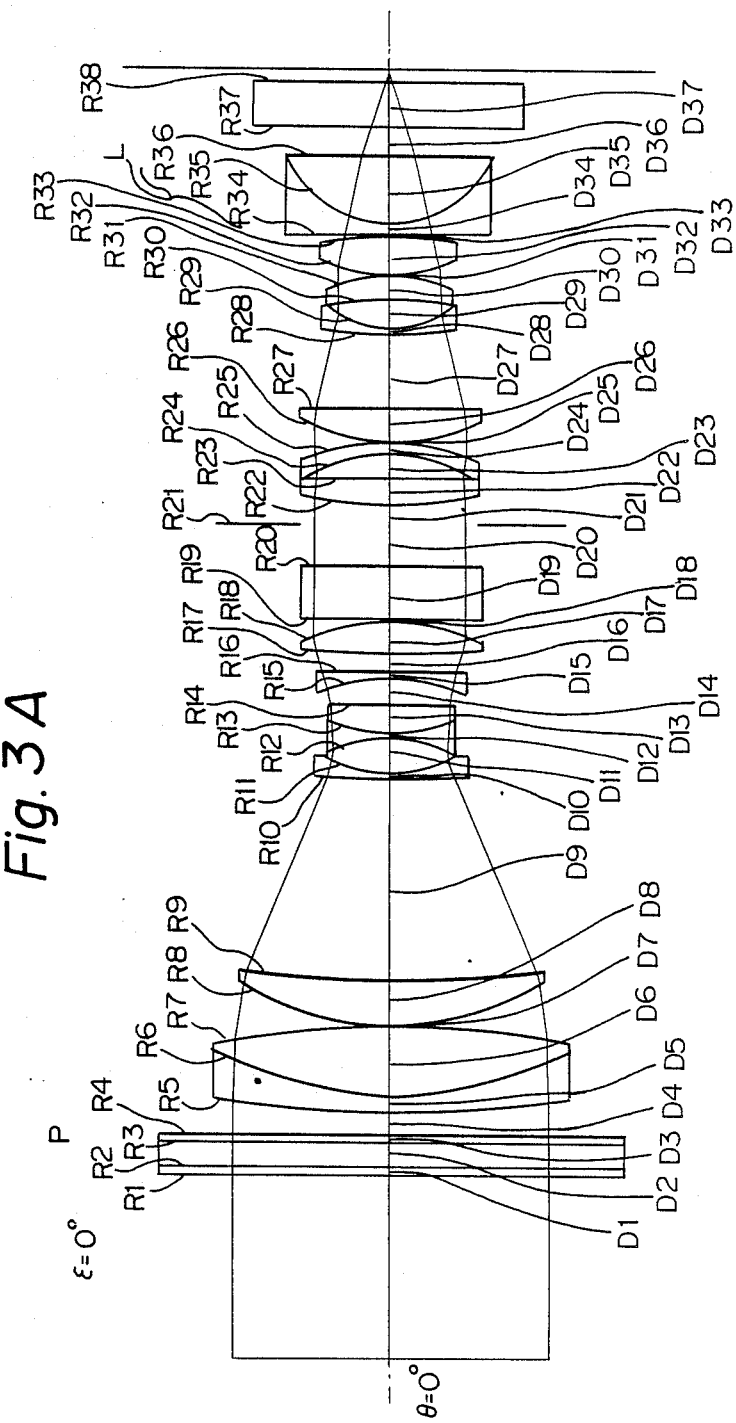
FIGS. 3A and 3B show a light path and a lateral aberration when an image is not deflected in an antivibration optical system shown in Tables 1 and 2.
Figure 3B:
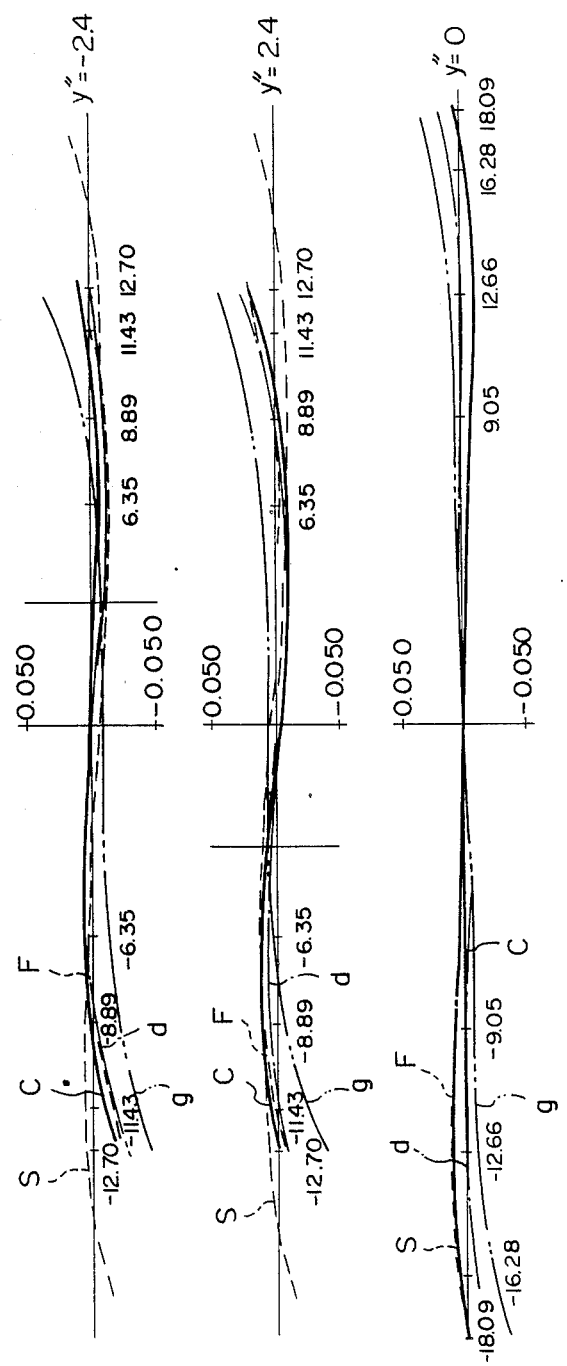
Figure 4A:
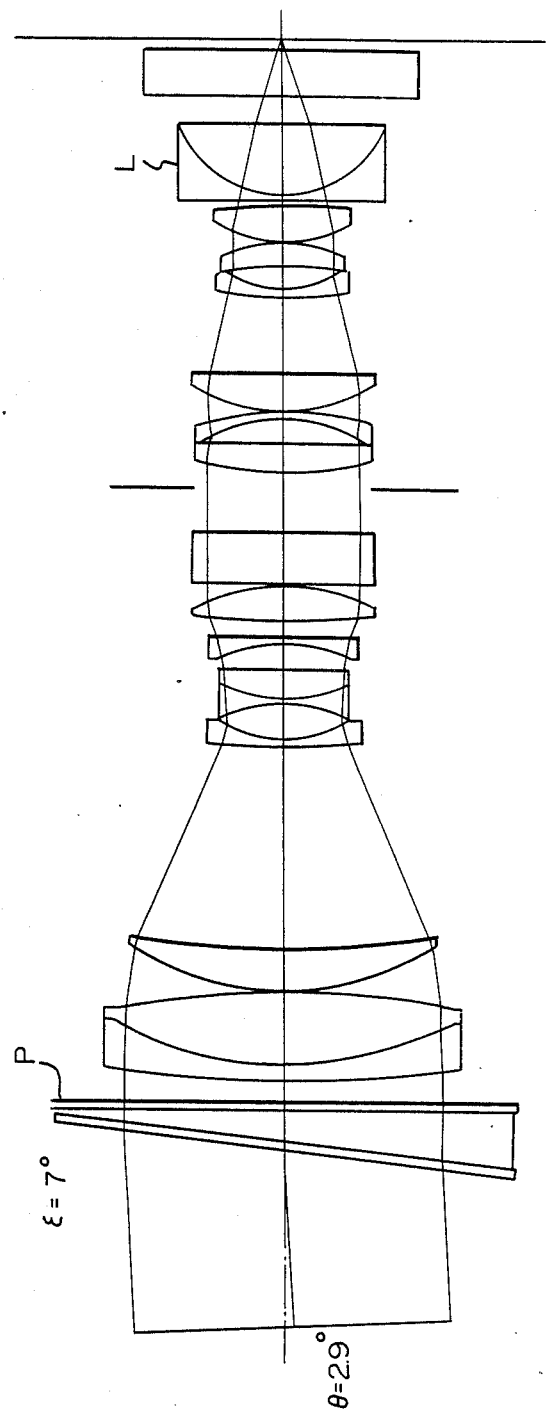
FIGS. 4A and 4B show a light path and a lateral aberration when the image is deflected only by a variable apex angle prism in the embodiment shown in Tables 1 and 2.
Figure 4B:
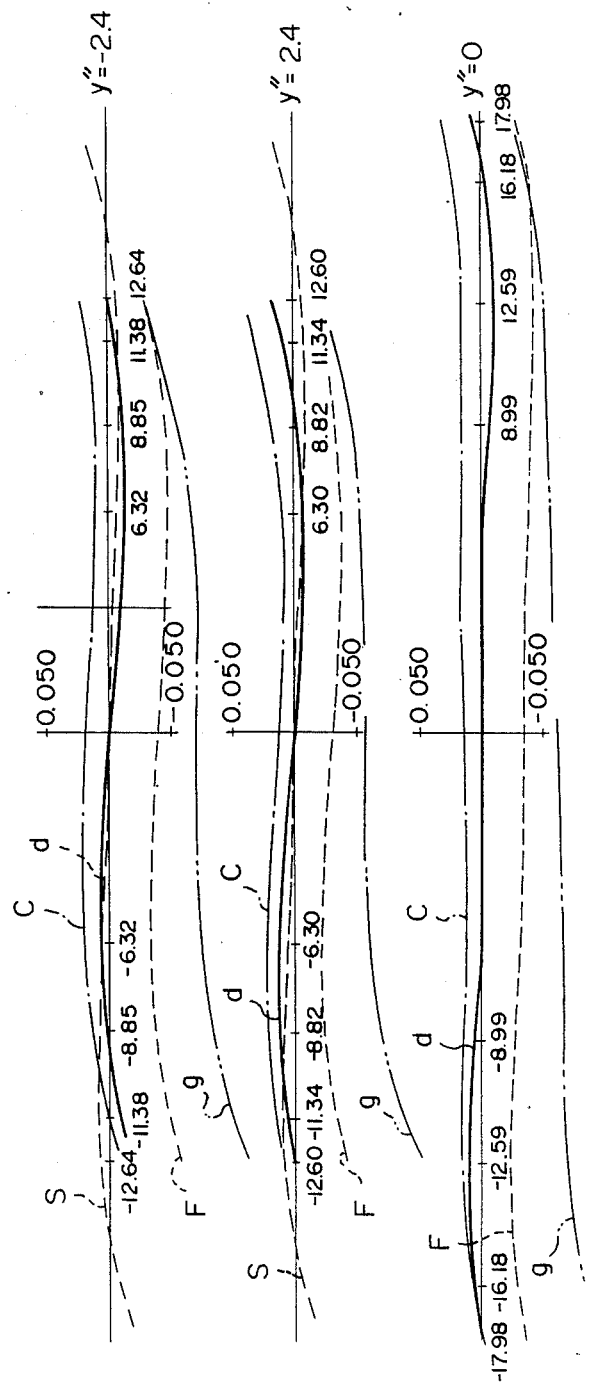
Figure 5A:
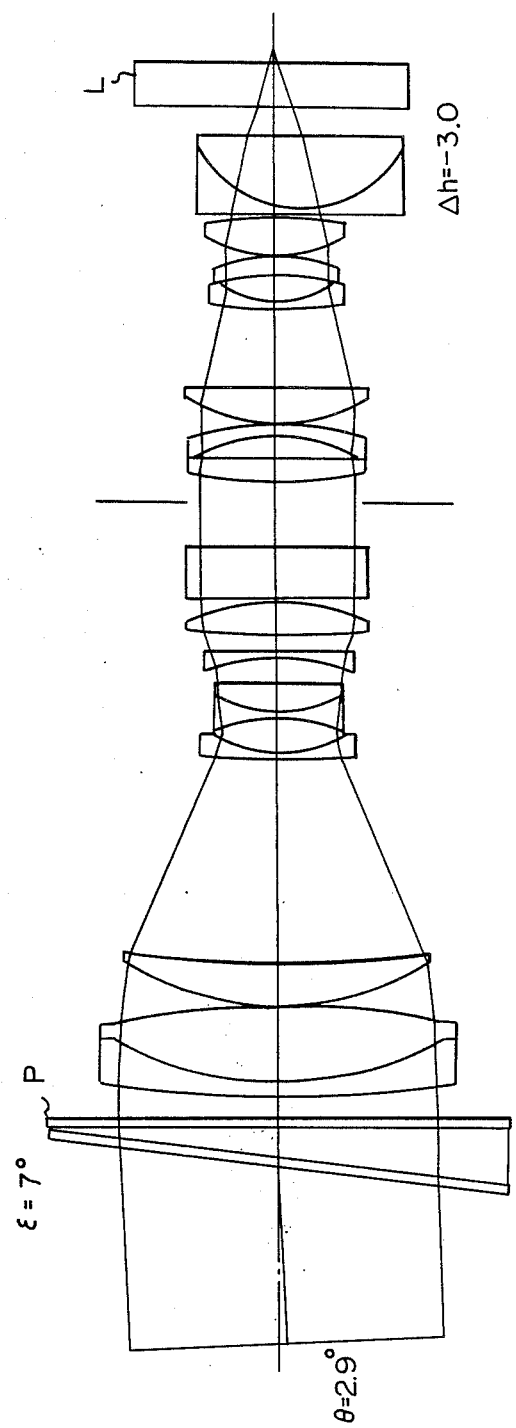
FIGS. 5A and 5B show a light path and a lateral aberration when the image is deflected by both the variable apex angle prism and aberration compensation lenses in the embodiment shown in Table 1.
Figure 5B:
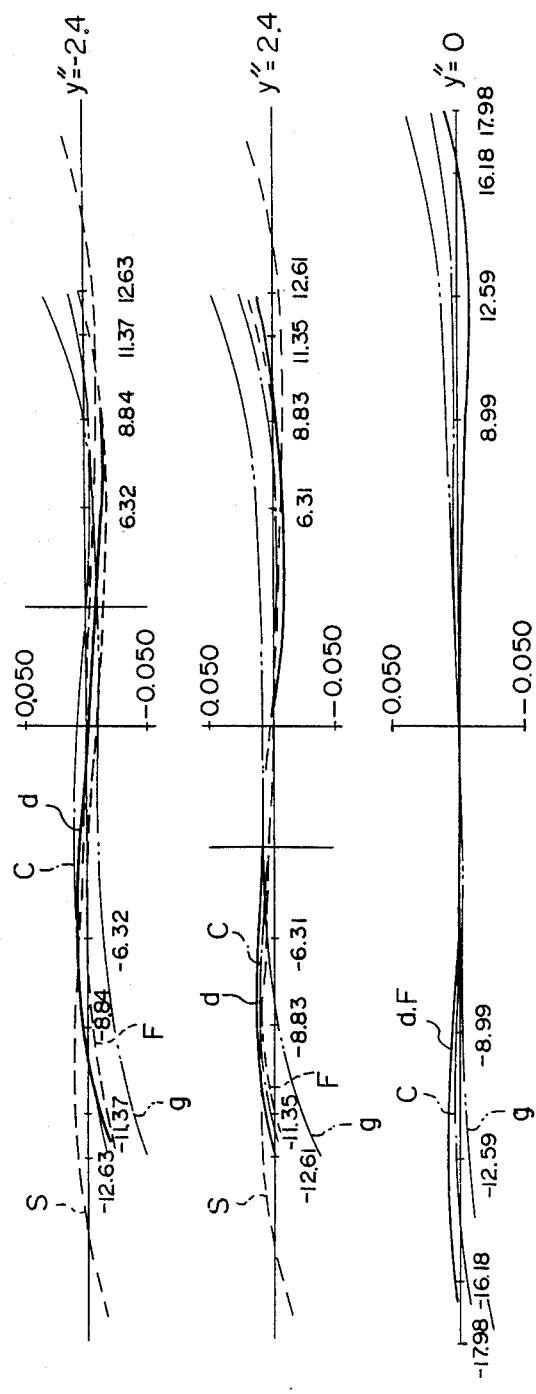
Figure 6A:
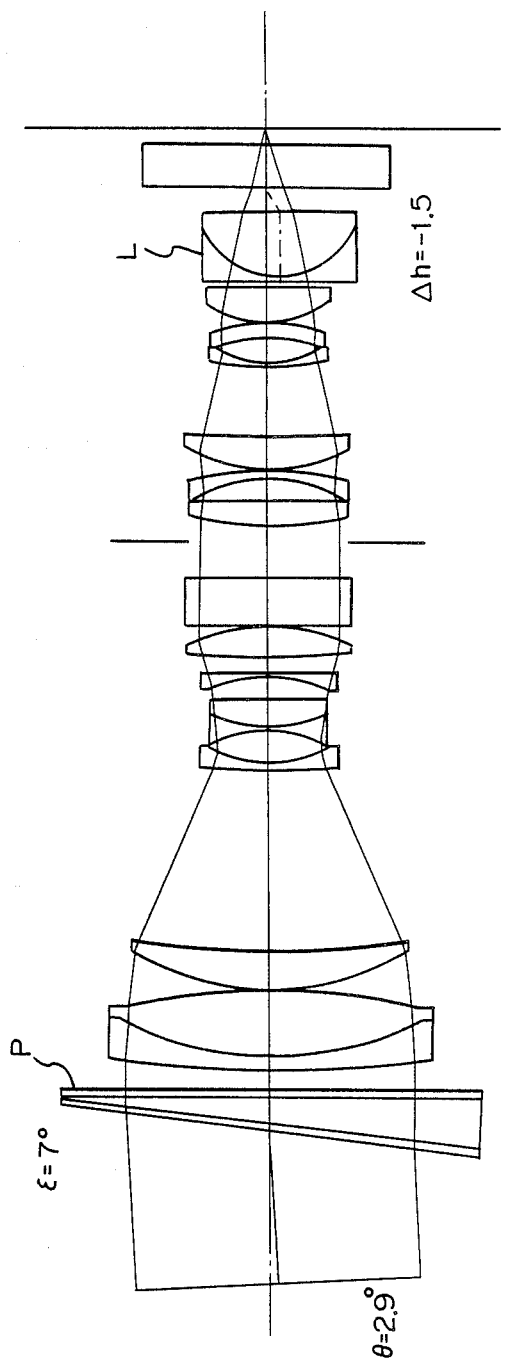
FIGS. 6A and 6B show a light path and a lateral aberration when the image is deflected by both the variable apex angle prism and aberration compensation lenses in the embodiment shown in Table 2.
Figure 6B:
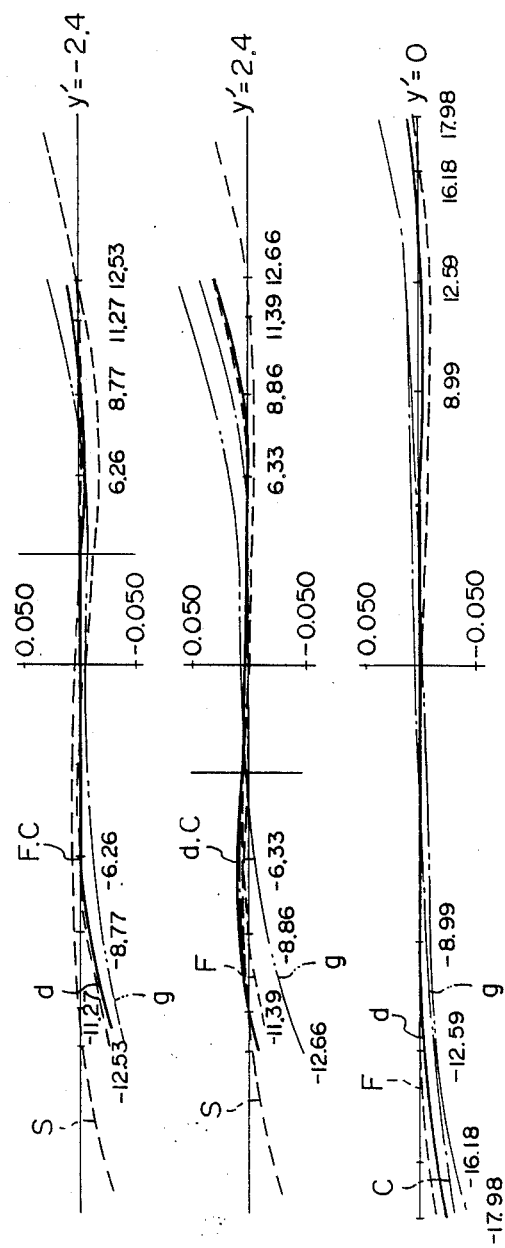

FIGS. 3A and 3B show a light path and a lateral aberration when the image is not deflected in the image stabilizing optical systems shown in Tables 1 and 2. FIGS. 4A and 4B show a light path and a lateral aberration when the image is deflected only by the variable apex angle prism in the image stabilizing optical systems shown in Tables 1 and 2. FIGS. 5A and 5B show a light path and a lateral aberration when the image is deflected by simultaneously driving the variable apex angle prism and the aberration correction lens unit in the image stabilizing optical system shown in Table 1. FIGS. 6A and 6B show a light path and a lateral aberration when the image is deflected by simultaneously driving the variable apex angle prism and the aberration compensation lens unit in the image stabilizing optical system shown in Table 2.

In FIG. 6, P denotes the variable apex angle prism, L denotes the aberration compensation lens unit, e represents an apex angle of the variable apex angle prism P, $\theta$ represents a deflection angle (compensation deflection angle) of the image, y' represents an image height, and Ah represents a displacement of the aberration compensation lens unit L normal to the optical axis. In the lateral aberration chart, d denotes the d-line, g denotes the g-line, c denotes the c-line, F denotes an F-line and S denotes a lateral abberation in a sagittal plane.

In the image stabilizing optical system of the present embodiment, the variable apex angle prism P as the refraction type image deflection means is arranged at a position of the overall system closest to the object, and the apex angle ε of the variable apex angle prism P is varied with the swing of the device so that the image is deflected to compensate for the swing of the image on the image plane. The magnification chromatic aberration (see FIG. 4) developed as the apex angle ε of the variable apex angle prism P is varied is compensated by parallelly off-centering the aberration compensation lens unit L comprising the concave lens and the convex lens arranged in the back stage of the system (see FIGS. 5 and 6).

In FIG. 6, the lenses of the zoom lens system are moved to the telescope ends. In the image stabilizing optical system shown in FIG. 5 (Table 1), the apex angle s of the prism P is set to 7° to deflect the image by 2.9° and the aberration compensation lens unit L is moved by Δh=−3.0 mm to compensate for the chromatic aberration. In the image stabilizing optical system shown in FIG. 6 (Table 2), the apex angle ε of the prism P is set to 7° to deflect the image by 2.9°, and the aberration correction lens unit L is moved by Δh=−1.5 mm to compensate for the chromatic aberration.

As seen from the comparison of the aberration charts, the aberration generated by the variable apex angle prism P is compensated by moving the aberration compensation lens unit L by Δh in linked relation to the variable apex angle prism P. Except for the variable apex angle prism P and the aberration compensation lens unit L, any optical system may be used for the image stabilizing optical system. However, care should be paid such that aberrations other than that generated by the variable apex angle prism P should be compensated for by the optical system, and the variable apex angle prism P and the aberration compensation lens unit L should not affect the aberration compensation of the overall system.

The apex angle ε of the variable apex angle prism P and the displacement Δh of the aberration compensation lens L are in an essentially linear relationship, and as the deflection angle of the image increases, the displacement also increases. When the apex angle ε of the variable apex angle prism is zero, the displacement Δh of the aberration correction lens unit is zero. In the image stabilizing optical system for the zoom lens of the present embodiment, the magnification chromatic aberration changes with zooming. Therefore, it is necessary to control the displacement of the aberration compensation lens unit in accordance with the variator position information. The displacement of the aberration compensation lens unit decreases as the lenses move from the telescope end to the wide angle end. At the wide angle end, the magnification chromatic aberration is not significant even if the image is deflected by the variable apex angle prism P.

Instead of the conventional spherical lens used in the present embodiment, a fresnel lens, a refraction coefficient distributed lens, a hologram lens or other lens may be used as the aberration compensation lens unit.

In accordance with the image stabilizing optical system of the present invention, in order to compensate for the swing of the image due to the swing of the device, the image is deflected by the refraction type image deflection means, and the chromatic aberration generated by the deflection means is compensated by the aberration compensation means. The refraction type image deflection means and the aberration compensation means are linked to always keep a high focusing performance.

Various modifications of the present embodiments may be made without departing from the concept of the present invention.

What is claimed is:

1. An optical system including an objective lens having an optical axis, comprising:
   image deflection means for moving an object image formed by the objective lens on an image plane by changing a refractive angle; and
   aberration suppression means, separate from said image deflecting means, for controlling and suppressing an aberration generated by said image deflection means, said aberration suppression means moving in relation to the refractive angle of said deflection means but independently from said deflection means,
   wherein a magnification chromatic aberration of the light forming the object image by a wavelength longer than a reference wavelength and a magnification chromatic aberration by a shorter wavelength occur in opposite polarities with respect to the reference wavelength.

2. An optical system according to claim 1 wherein said aberration suppression means is moved by a distance corresponding to the refraction angle set by said image deflector.

3. An optical system, according to claim 2, wherein said aberration suppression means is moved substantially normal to the optical axis of said objective lens and has at least one positive lens and at least one negative lens.

4. An optical system according to claim 3 wherein an Abbe number Vd1 of said positive lens, an Abbe number Vd2 of said negative lens and a composite power φ of said lens unit at the reference wavelength meet relationships of $$\phi \approx 0$$

and $$|Vd1-Vd2| \gtrsim 15$$

5. An optical system according to claim I wherein the movement of the object image on the image plane by said deflector is effected in synchronism with a vibration of said optical system by an external force.

6. An optical system according to claim 1, said image deflection means being arranged at an object side of said objective lens.

7. An optical system according to claim 1, said aberration suppression means being arranged at an image plane side of said objective lens.

8. An optical system for stabilizing an image formed by an objective lens by an image deflector of a variable angle, comprising:
   an optical unit being arranged at an image plane side of said objective lens and comprising a plurality of optical elements having different dispersions for suppressing an aberration of the image due to the refraction by said deflector, said optical unit being displaced substantially in the direction perpendicular to an optical axis of the objective lens in accordance with the refraction angle of said deflector.

9. An optical system according to claim 8 wherein one of said optical elements is a positive lens and another of said optical lens is a negative lens.

10. An optical system according to claim 9 wherein said positive lens is a plane-convex lens and said negative lens is a plane-concave lens, and both lenses are joined together.

11. An optical system according to claim 8, said image deflector being arranged at an object side of said objective lens.

* * * * *